Oct. 16, 1934.   C. W. KANOLT   1,977,310
CAMERA ACTUATING MECHANISM
Filed May 23, 1930   4 Sheets-Sheet 1

INVENTOR
*Clarence W. Kanolt*
BY *Harry Lea Dodson*
ATTORNEY

Oct. 16, 1934.   C. W. KANOLT   1,977,310
CAMERA ACTUATING MECHANISM
Filed May 23, 1930   4 Sheets-Sheet 2

INVENTOR
*Clarence W. Kanolt*
BY
*Harry Lea Dodson*
ATTORNEY

Oct. 16, 1934.  C. W. KANOLT  1,977,310

CAMERA ACTUATING MECHANISM

Filed May 23, 1930  4 Sheets-Sheet 3

INVENTOR
*Clarence W. Kanolt*
BY
*Harry Lea Dodson*
ATTORNEY

Oct. 16, 1934.  C. W. KANOLT  1,977,310
CAMERA ACTUATING MECHANISM
Filed May 23, 1930   4 Sheets-Sheet 4

INVENTOR
Clarence W. Kanolt
BY
Harry Lea Dodson
ATTORNEY

Patented Oct. 16, 1934

1,977,310

UNITED STATES PATENT OFFICE 1,977,310

CAMERA ACTUATING MECHANISM

Clarence W. Kanolt, New York, N. Y.

Application May 23, 1930, Serial No. 454,865

3 Claims. (Cl. 88—16)

My invention relates to that class of cameras used for taking depthograph pictures, this being the term I employ as descriptive of pictures taken by the method set forth in my United States Patent No. 1,260,682, issued March 26, 1918, in which there is a movement imparted to the camera, which is swung about the arc of a circle, of which the object to be photographed constitutes the center, together with a movement of the photographic plate across a screen formed of alternate transparent and opaque vertical lines. The trade-mark "Depthograph" as applied to pictures produced by said patented method, is covered by certificate of registration No. 261,335, issued September 17, 1929.

It is of vital importance, in commercial operation of a camera for utilizing the method above referred to, to be able to cause the camera to move at different speeds, as the speed is directly controlled by conditions entirely extraneous to the camera, it being well known to persons skilled in the art that different conditions require varying duration of time for exposure of the photographic plates. For example, pictures of children should be made with a very short exposure, whereas in taking pictures of "still life" a very long exposure, with small diaphragm, should be used. Moreover, inasmuch as the best magnitudes of the angle through which the camera should be moved depends somewhat upon the subject being photographed, for a given exposure the speed required will depend upon the angle. Necessarily, for a given angle and exposure, the speed required will depend upon the distance of the camera from the object being photographed.

My invention has for its object, to provide a mechanism which will furnish a variation of speeds for those devices wherein the driving mechanism for propelling the camera also drives the mechanism for moving the plate across the face of the lined screen.

A further object is, to accomplish this result by means of very small and compact mechanism.

A concrete embodiment of my invention is illustrated in the accompanying drawings, which are to be considered as a part of this specification, in which—

Similar reference numerals refer to similar parts throughout the entire description.

Figure 1:
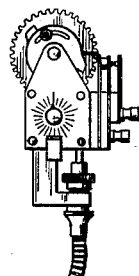
Fig. 1 is a side elevation of my invention applied to a depthograph camera, only fragmentary portions of the latter being shown.
Figure 1:
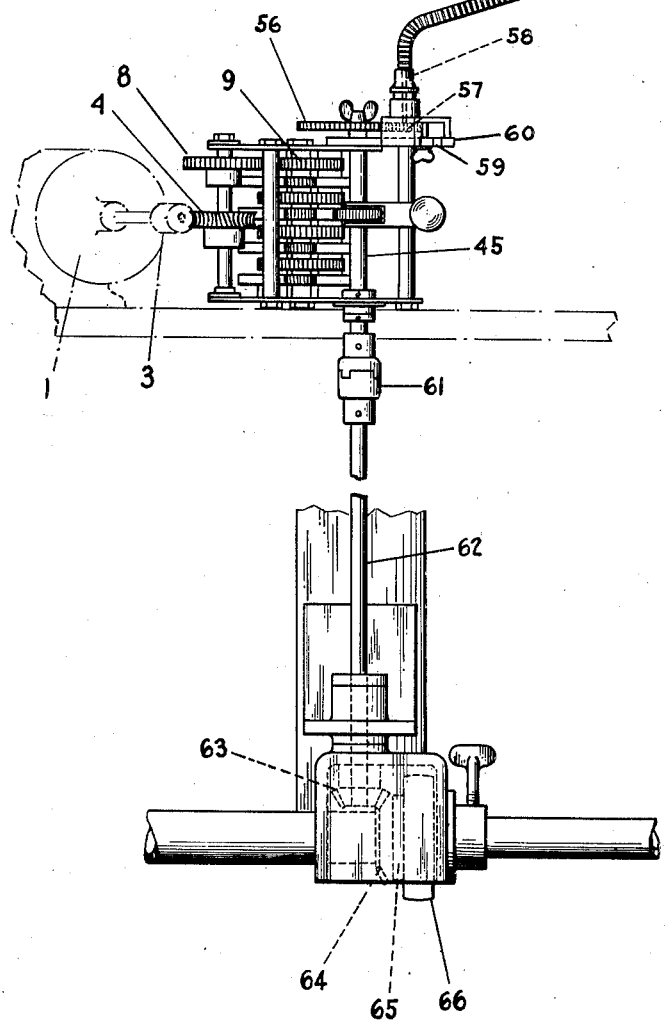
Figure 2:
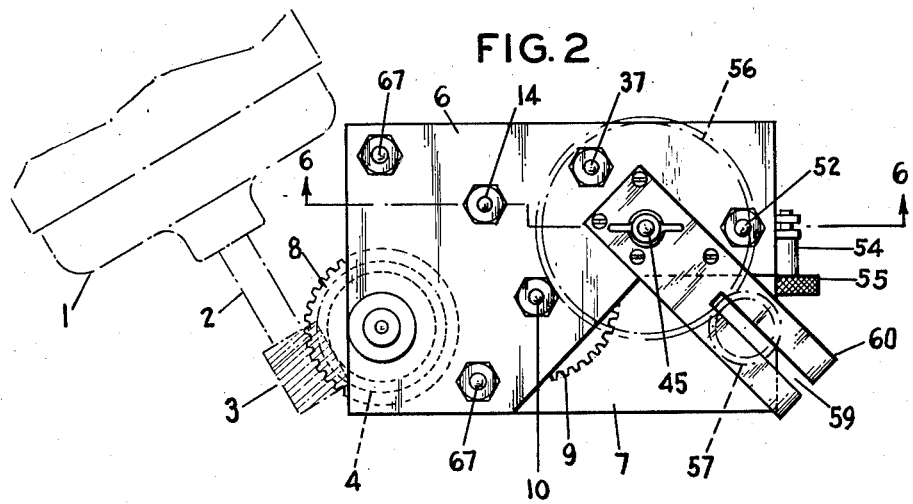
Fig. 2 is a top or plan view of the driving mechanism and its case, showing in dotted lines the electric motor for propelling said driving mechanism.
Figure 3:
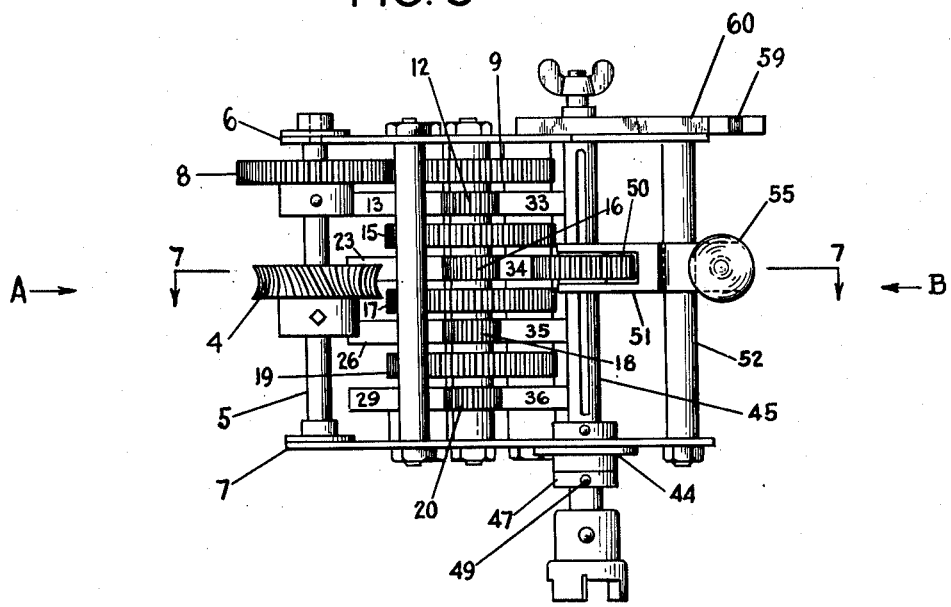
Fig. 3 is a side elevation.
Figure 4:
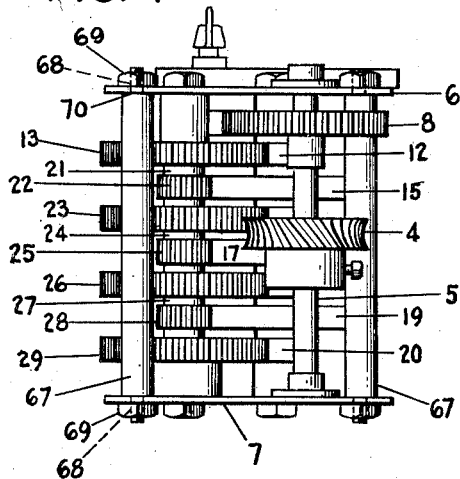
Fig. 4 is an end elevation, taken from the left-hand side of Fig. 3 in the direction of the arrow "A"
Figure 5:
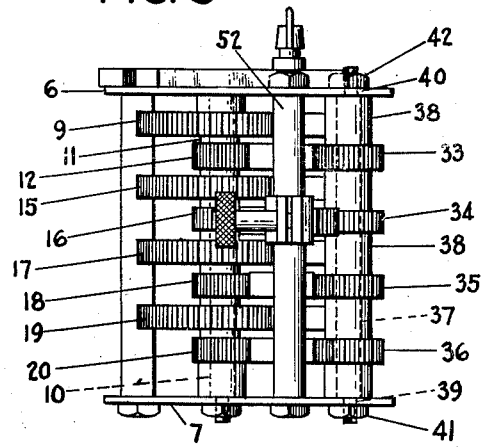
Fig. 5 is an end elevation, taken from the right-hand side of Fig. 3 in the direction of the arrow "B"
Figure 6:
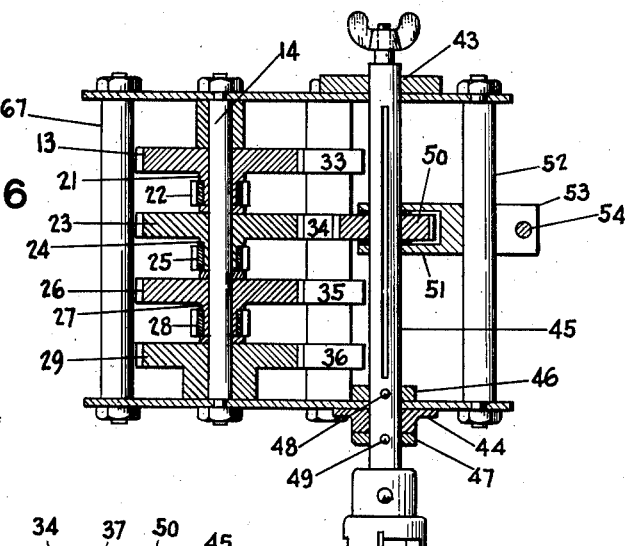
Fig. 6 is a vertical sectional view, the main driving shaft being shown in elevation.
Figure 7:
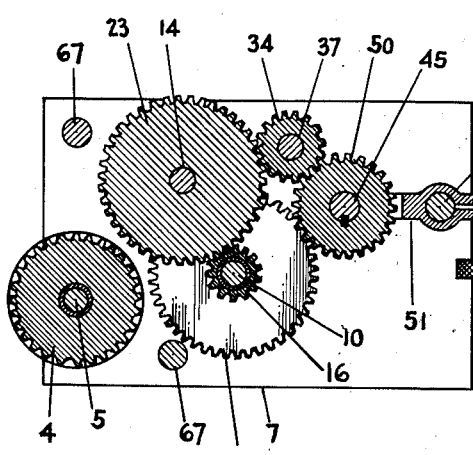
Fig. 7 is a sectional view, taken on the line 7—7 in Fig. 3.

As shown in the drawings, the mechanism includes an electric motor 1, shown in dash and dot lines in Fig. 2. The shaft 2 of this motor 1 carries a worm 3, which engages a worm gear 4, mounted upon a shaft 5, the ends of which are suitably journaled in plates 6 and 7. The worm gear 4 is rigidly attached to the shaft 5, to which is attached a gear 8, the teeth of which are in mesh with a gear 9, carried by a shaft 10. This gear 9 is rotatably mounted on the shaft 10, and is provided with a hub 11, upon which is fixedly mounted a pinion 12. There are four pairs of these gears and pinions on the shaft 10, being respectively 9 and 12, 15 and 16, 17 and 18, and 19 and 20.

Mounted upon the shaft 14, the ends of which are supported in the plates 6 and 7, is a gear 13. This gear 13 meshes with pinion 12 on shaft 10, and has a downwardly depending hub 21, upon which is fixedly mounted a pinion 22, the teeth of which mesh with the teeth of a gear 15, rotatably mounted upon the shaft 10. This gear 15 also has a hub upon which is fixedly mounted a pinion 16, the teeth of which mesh with the teeth on a gear 23, mounted upon shaft 14. This gear 23 also has a downwardly depending hub 24, to which is fixedly secured a pinion 25, the teeth of which mesh with the teeth of a gear 17, rotatably mounted on shaft 10. This gear 17 also has a hub upon which is fixedly mounted a pinion 18, the teeth of which mesh with the teeth on a gear 26, rotatably mounted on the shaft 14. This gear 26 also has a hub upon which is fixedly mounted a pinion 28, the teeth of which mesh with the teeth on a gear 19, rotatably mounted on the shaft 10. Fixedly mounted on the hub of the gear 19, is a pinion 20, rotatable on shaft 10, the teeth of which mesh with the teeth of a gear 29, rotatably mounted upon shaft 14. Each of the gears 13, 23, 26, and 29, mesh with pinions 33, 34, 35, and 36, rotatably mounted on a shaft 37, said pinions being held in spaced relation to each other by means of collars 38. The ends 39 and 40 of the shaft 37 are held in place in the plates 6 and 7, by means of nuts 41 and 42, or in any other suitable or convenient manner.

Bearings 43 and 44 are provided on the plates 6 and 7 for a driving shaft 45, which is prevented from longitudinal movement by two collars 46 and 47, secured to the shaft 45 by pins 48 and 49. The driving shaft 45 is rotated by means of a pinion 50, adapted to mesh with the teeth of either one of the gears 13, 23, 26, 29, 33, 34, 35, or 36. This pinion 50 is splined upon the driving shaft 45, and is carried by an adjustable support 51, secured to a shaft 52. The support 51 is provided with split clamp 53, in which is mounted a screw 54, to clamp the support 51 in the proper plane to register with the desired pinion on the shaft 37, or gear on the shaft 14, a knurled disc 55 being provided for convenience in turning said screw 54 to clamp the support 51 on the shaft 52 in the desired plane. From the foregoing it will be seen that the gears mounted upon shafts 10 and 14 are all free to rotate upon their respective shafts, but are attached to each other by means of the pinions fixed upon their hubs in the manner described.

I provide for each gear and pinion to receive power on the gear, which is much larger than the pinion, from the pinion of the preceding pair, and to deliver power to the pinion of the next pair; therefore, the speed of any given gear and pinion is less than that of the preceding gear and pinion, in the ratio of the number of teeth in the gears and pinions, hence, by shifting the position of the pinion 50, a variety of speeds for the shaft 45 can be obtained. If desired, a standard rheostat (not shown) may be connected in the line to the motor to secure a further variation in speed.

Figure 8:
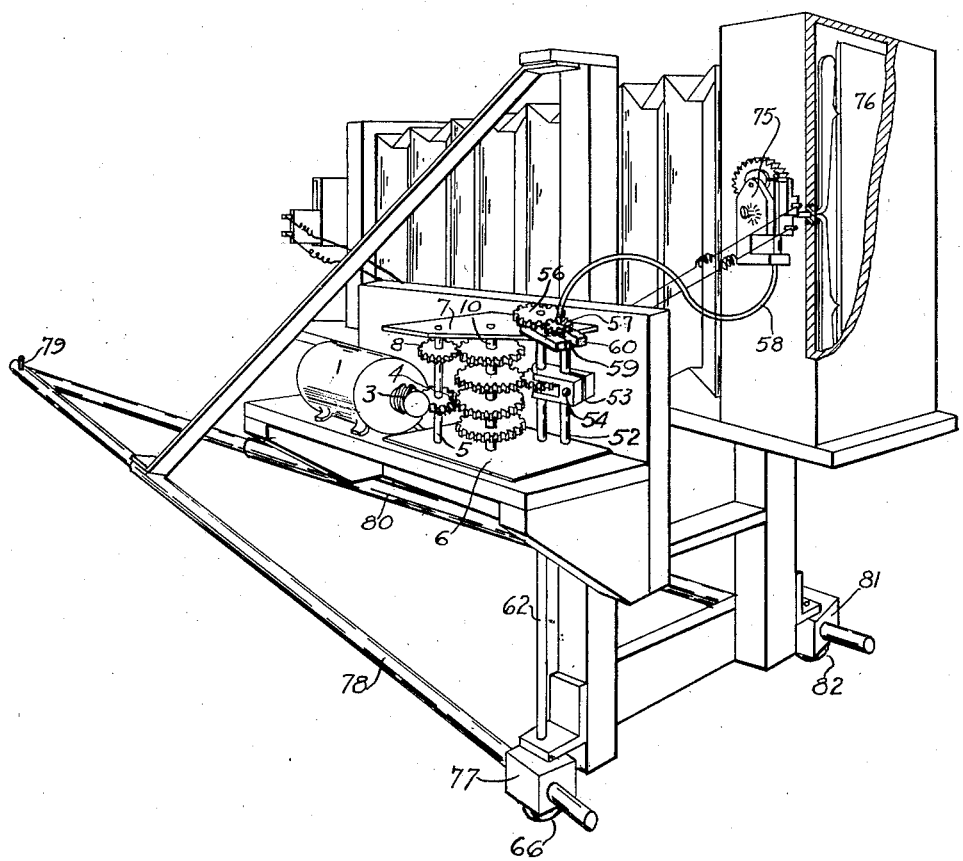
Fig. 8 is an assembled view of a camera with my invention attached thereto.

It is essential that the photographic plate be moved in correct synchronization with the movement of the camera; therefore I provide a gear 56, mounted upon the end of the driving shaft 45, which meshes with a gear 57, mounted upon one end of a flexible shaft 58, which leads to the mechanism 75 for moving the plate 76 as shown in Fig. 8. Since this mechanism is the subject matter of my Patent #1,947,555, issued Feb. 20, 1934, I shall not describe it here.

Provision is made for varying the speed of flexible shaft 58, by a slot 59 formed in a support 60, in which is mounted the shaft 45 to which the gear 56 is secured as the slot permits the substitution of various sizes of gears in the place of the gear 57 thus varying the speed of shaft 58. This shaft 58 has to be flexible, to permit the camera to be raised, lowered, or altered, as may be required by the conditions under which the picture is to be taken.

It will be obvious, to persons skilled in the art, that in this manner I am able to provide for varying speeds for movement of the camera, and also that the movement of the plate is so connected thereto that the two will synchronize, regardless of the change of speed or movement of the camera.

The driving shaft 45 is connected, through a flexible coupling 61, to a driving shaft 62, which carries a bevel pinion 63, which meshes with another bevel pinion 64, secured to the hub 65 of a roller 66, so that rotation of the driving shaft 45 will, through the medium of the rollers 66 and 82, impart the desired motion to the camera. The gears 63 and 64 are mounted in a housing 77 which is mounted upon a rod 78 which is pivotally secured to a pivot 79, and another rod 80 is also secured to the pivot 79 and extends through a housing 81 to which the leg of the camera is secured. The rod 80 is provided with a roller 82.

I provide a plurality of posts 67, which serve to hold the plates 6 and 7 in correct spaced position, the posts 67 being provided with reduced stems or necks 68, which extend through said plates 6 and 7. Nuts 69 serve to draw the plates 6 and 7 tightly against shoulders 70 on the posts 67, and thus hold said plates 6 and 7 in correct alignment.

Having described my invention, what I regard as new, and desire to secure by Letters Patent of the United States, is:

1. In combination with a camera, provided with mechanism to impart to said camera motion about the object to be photographed, said camera having a photographic plate, a screen for distributing light onto narrow line-like portions of said photographic plate and mechanism for producing relative motion between said photographic plate and said screen, a succession of gears so meshed together as to move at different speeds, means to drive said gears, a pinion, a shaft on which said pinion is splined, a support for said pinion, a second shaft, means to secure said support in adjusted position on said second shaft whereby said pinion may be caused to mesh with a selected gear of said succession of gears and means connecting the shaft on which said pinion is splined with said camera-moving mechanism and with said mechanism for producing relative motion between said photographic plate and said screen whereby said mechanisms are driven.

2. In combination with a camera, provided with mechanism to impart to said camera motion about the object to be photographed, said camera having a photographic plate, a screen for distributing light onto narrow line-like portions of said photographic plate and mechanism for producing relative motion between said photographic plate and said screen, a succession of gears so meshed together as to move at different speeds, means to drive said gears, a pinion, a shaft driven by said pinion, means to adjustably support said pinion on said shaft whereby it may be driven by a selected gear of said succession of gears, means connecting said shaft with said camera-moving mechanism whereby said mechanism is driven, and flexible means connecting said shaft with said mechanism for producing relative motion between said photographic plate and said screen whereby said mechanism is driven.

3. In combination with a camera, provided with mechanism to impart to said camera motion about the object to be photographed, said camera having a photographic plate, a screen for distributing light onto narrow line-like portions of said photographic plate and mechanism for producing relative motion between said photographic plate and said screen, a succession of gears so meshed together as to move at different speeds, means to drive said gears, a pinion, a pinion shaft driven by said pinion, means to adjustably support said pinion on said shaft whereby it may be driven by a selected gear of said succession of gears, means connecting said shaft with said camera-moving mechanism whereby said mechanism is driven, a gear mounted on said pinion shaft, a flexible shaft which extends from said mechanism for producing relative motion between said photographic plate and said screen to a point adjacent said last-mentioned gear, and means whereby gears of different sizes may be mounted on said flexible shaft to mesh with the gear of the pinion shaft whereby said flexible shaft is driven at an adjustable speed.

CLARENCE W. KANOLT.